(12) United States Patent
Kunwar et al.

(10) Patent No.: US 12,475,144 B2
(45) Date of Patent: Nov. 18, 2025

(54) MACHINE LEARNING BASED SYSTEMS AND METHODS FOR IDENTIFICATION OF TRANSACTION CATEGORY FROM CODED ERP DATA

(71) Applicant: HIGHRADIUS CORPORATION, Houston, TX (US)

(72) Inventors: Anupam Kunwar, Hyderabad (IN); Ramit Roy Burman, Hyderabad (IN); Apoorva Shrivastava, Hyderabad (IN); Safal Upadhaya, Hyderabad (IN)

(73) Assignee: HIGHRADIUS CORPORATION

( * ) Notice: Subject to any disclaimer, the term of this patent is extended or adjusted under 35 U.S.C. 154(b) by 0 days.

(21) Appl. No.: 18/399,763

(22) Filed: Dec. 29, 2023

(65) Prior Publication Data

US 2025/0217385 A1 Jul. 3, 2025

(51) Int. Cl.
*G06F 16/28* (2019.01)
*G06Q 40/12* (2023.01)

(52) U.S. Cl.
CPC .......... *G06F 16/285* (2019.01); *G06Q 40/12* (2013.12)

(58) Field of Classification Search
CPC ............. G06F 16/211–213; G06F 16/285
See application file for complete search history.

(56) References Cited

U.S. PATENT DOCUMENTS

| | | | |
|---|---|---|---|
| 8,060,423 B1* | 11/2011 | Rukonic | G06Q 40/02 707/950 |
| 2019/0138509 A1* | 5/2019 | von Rickenbach | G06F 11/0727 |
| 2022/0222277 A1* | 7/2022 | Pasumarthy | G06F 16/951 |
| 2023/0410134 A1* | 12/2023 | Khanafer | G06F 18/285 |
| 2024/0127519 A1* | 4/2024 | Storey | G06T 17/205 |

* cited by examiner

*Primary Examiner* — Robert W Beausoliel, Jr.
*Assistant Examiner* — Nirav K Khakhar
(74) *Attorney, Agent, or Firm* — Jason C. Cameron

(57) ABSTRACT

A machine learning based (ML-based) computing method for identifying transaction categories from enterprise resource planning (ERP) data, is disclosed. The machine learning based computing method includes steps of: receiving inputs from electronic devices associated with first users; retrieving first data associated with first transactions from databases, based on the inputs received from the electronic devices associated with the first users; generating features associated with the transaction categories based on the first data associated with the first transactions; identifying first transaction categories based on at least one of: the first data associated with the first transactions and the features associated with the transaction categories, by clustering based machine learning models; identifying second transaction categories based on pre-configured rules; and providing an output of at least one of: the first transaction categories and the second transaction categories, to the first users on user interfaces associated with the electronic devices.

14 Claims, 6 Drawing Sheets

400A

| Document Number 402 | Clearing Document Number 404 | Clearing Date 406 | Doc Type 408 | Posting Key 410 | Posting Date 412 | Amount 414 |
|---|---|---|---|---|---|---|
| 102639603 | 2000246242 | 02/07/2023 | AB | 14 | 10/19/2022 | 633.65 |
| 1400357672 | 102683691 | 02/06/2023 | DZ | 15 | 11/14/2022 | 45472.15 |
| 1400359422 | 102683691 | 02/06/2023 | DZ | 15 | 12/27/2022 | 45472.15 |
| 3029003745 | 1400360860 | 02/02/2023 | RV | 1 | 9/30/2022 | 63113.81 |
| 4211000803 | 2000246243 | 02/07/2023 | RV | 11 | 8/10/2022 | 1593 |
| 4211000931 | 1400360869 | 02/02/2023 | RV | 1 | 9/15/2022 | 695.88 |

| Document Number 402 | Clearing Document Number 404 | Clearing Date 406 | Doc Type 408 | Posting Key 410 | Posting Date 412 | Amount 414 | Transaction Category 416 |
|---|---|---|---|---|---|---|---|
| 102639603 | 2000246242 | 02/07/2023 | AB | 14 | 10/19/2022 | 633.65 | PRIMARY INVOICE |
| 1400357672 | 102683691 | 02/06/2023 | DZ | 15 | 11/14/2022 | 45472.15 | INVOICE REVERSAL |
| 1400359422 | 102683691 | 02/06/2023 | DZ | 82 | 12/27/2022 | 45472.15 | SECONDARY PAYMENT |
| 3029003745 | 1400360860 | 02/02/2023 | RG | 1 | 9/30/2022 | 63113.81 | ADJUSTMENT |
| 4211000803 | 2000246243 | 02/07/2023 | RV | 11 | 8/10/2022 | 1593 | DEDUCTIONS |
| 4211000931 | 1400360869 | 02/02/2023 | RV | 1 | 9/15/2022 | 695.88 | CREDIT MEMO |

FIG. 4B

MACHINE LEARNING BASED SYSTEMS AND METHODS FOR IDENTIFICATION OF TRANSACTION CATEGORY FROM CODED ERP DATA

FIELD OF INVENTION

Embodiments of the present disclosure relate to machine learning based (ML-based) computing systems, and more particularly relate to an ML-based computing method and system for identifying one or more transaction categories from one or more coded enterprise resource planning (ERP) data.

BACKGROUND

Enterprise Resource Planning (ERP) systems, like Systems Applications and Products (SAP®), store data using coded formats, including one or more elements comprising at least one of: document type and posting key, among others. The diverse codes across different companies introduce complexity, making interpretation challenging and necessitating significant human expertise. The manual decoding of ERP data poses various challenges in managing and understanding the information effectively.

To begin, an absence of standardized interpretation impedes an automation of processes, requiring substantial human involvement in transaction processing, which results in delays and hinders scalability. Additionally, the classification of transactions becomes an arduous, time-intensive, and error-prone task in the absence of a systematic approach to decoding ERP data formats. Furthermore, the misclassification of transactions stemming from human errors has repercussions on financial reporting and decision-making processes.

Hence, there is a need for an improved machine learning based (ML-based) computing system and method for identifying one or more transaction categories from one or more coded enterprise resource planning (ERP) data, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a machine-learning based (ML-based) computing method for identifying one or more transaction categories from one or more coded enterprise resource planning (ERP) data, is disclosed. The ML-based computing method comprises receiving, by one or more hardware processors, one or more inputs from one or more electronic devices associated with one or more first users. The one or more inputs comprise one or more first information related to at least one of: one or more entities associated with one or more second users and one or more transaction datasets.

The ML-based computing method further comprises retrieving, by the one or more hardware processors, one or more first data associated with one or more first transactions from one or more databases, based on the one or more inputs received from the one or more electronic devices associated with the one or more first users. The one or more first data associated with the one or more first transactions comprise at least one of: one or more document types, one or more posting keys, one or more posting dates, one or more clearing dates, one or more amounts, one or more document numbers, one or more clearing documents, and a combination of the one or more documents types and the one or more posting keys.

The ML-based computing method further comprises generating, by the one or more hardware processors, one or more features associated with the one or more transaction categories based on the one or more first data associated with the one or more first transactions. The one or more features associated with the one or more transaction categories comprise at least one of: one or more cleared by features, one or more cleared together features, and one or more generated by features.

The ML-based computing method further comprises identifying, by the one or more hardware processors, one or more first transaction categories based on at least one of: the one or more first data associated with the one or more first transactions and the one or more features associated with the one or more transaction categories, by one or more clustering based machine learning models.

The ML-based computing method further comprises identifying, by the one or more hardware processors, one or more second transaction categories based on one or more pre-configured rules. The one or more second transaction categories are unidentified transaction categories by the one or more clustering based machine learning models during identification of the one or more first transaction categories.

The ML-based computing method further comprises providing, by the one or more hardware processors, an output of at least one of: the one or more first transaction categories and the one or more second transaction categories, to the one or more first users on one or more user interfaces associated with the one or more electronic devices.

In an embodiment, the one or more transaction datasets retrieved from the one or more enterprise resource planning (ERP) platforms indicate one or more structured compilations of one or more second data comprising at least one of: financial data, of the one or more organizations. The one or more transaction datasets comprise one or more financial events comprising one or more second information related to at least one of: one or more purchases, one or more sales, one or more payments, one or more investments, one or more loans, involvement of the one or more first users and the one or more second users, one or more amounts transacted, dates and times, and one or more transaction types.

In another embodiment, identifying, by the one or more hardware processors, the one or more second transaction categories based on the one or more pre-configured rules, comprises: (a) generating, by the one or more hardware processors, at least one of: one or more credit repositories and one or more debit repositories; (b) generating, by the one or more hardware processors, one or more permutations and combinations of one or more second transactions to minimize one or more differences between one or more values of the one or more credit repositories and the one or more debit repositories; (c) applying, by the one or more hardware processors, a combination of a document type and posting key pair in the one or more credit repositories and the one or more debit repositories, in one or more distributions; (d) determining, by the one or more hardware processors, one or more differences between the one or more credit repositories and the one or more debit repositories, for each distribution; and (e) selecting, by the one or more hardware processors, the one or more distributions where the one or more differences between the one or more credit repositories and the one or more debit repositories provide a predetermined value.

The one or more credit repositories comprise at least one of: one or more primary payments, one or more secondary payments, one or more payment reversals, one or more adjustments, and one or more deductions. The one or more debit repositories comprise at least one of: one or more primary invoices, one or more secondary invoices, one or more invoice reversals, one or more credit memos, and one or more debit memos.

In yet another embodiment, the ML-based computing method further comprises generating, by the one or more hardware processors, one or more relationships between one or more combinations of document type and posting key pairs to group the one or more first transactions, based on the one or more cleared by features, by: (a) determining, by the one or more hardware processors, whether a percentage of a first amount associated with a first combination of a first document type and posting key pair is cleared by a second amount associated with a second combination of a second document type and posting key pair; and (b) indicating, by the one or more hardware processors, the one or more relationships between the one or more combinations of the document type and posting key pairs when the first amount associated with the first combination of the first document type and posting key pair is determined to be cleared by the second amount associated with the second combination of the second document type and posting key pair.

The one or more combinations of the document type and posting key pairs comprise at least one of: the first combination of the first document type and posting key pair and the second combination of the second document type and posting key pair. A first clearing document associated with the first combination of the first document type and posting key pair is analogous to a second clearing document associated with the second combination of the second document type and posting key pair, to indicate that the one or more first transactions grouped by the one or more combinations of the document type and posting key pairs, are mutually cleared against each of the one or more combinations of the document type and posting key pairs.

In yet another embodiment, the ML-based computing method further comprises quantifying, by the one or more hardware processors, the one or more relationships between the one or more combinations of the document type and posting key pairs in the one or more first transactions, based on the one or more cleared together features, by: (a) determining, by the one or more hardware processors, whether a percentage of each combination of the one or more combinations of the document type and posting key pairs is cleared together with the one or more combinations of the document type and posting key pairs; and (b) indicating, by the one or more hardware processors, that the one or more clearing documents and the one or more clearing dates for the one or more combinations of the document type and posting key pairs, are analogous when the percentage of each unique combination of the one or more combinations of the document type and posting key pairs is determined to be cleared together with the one or more combinations of the document type and posting key pairs.

In yet another embodiment, the ML-based computing method further comprises generating, by the one or more hardware processors, the one or more relationships between the one or more combinations of the document type and posting key pairs in the one or more first transactions, based on the one or more generated by features, by: (a) determining, by the one or more hardware processors, whether first transaction data associated with the first combination of the first document type and posting key pair is generated by second transaction data associated with the second combination of the second document type and posting key pair; and (b) indicating, by the one or more hardware processors, one or more dependencies where a first transaction associated with the first combination of the first document type and posting key pair, is linked to a second transaction associated with the second combination of the second document type and posting key pair, when the first transaction data are determined to be generated by the second transaction data.

In yet another embodiment, the ML-based computing method further comprises training, by the one or more hardware processors, the one or more clustering based machine learning models comprising a density-based spatial clustering of applications with noise (DBSCAN) model, by: (a) receiving, by the one or more hardware processors, one or more training datasets associated with at least one of: the one or more first data associated with the one or more first transactions and the one or more features associated with the one or more transaction categories; (b) selecting, by the one or more hardware processors, one or more first hyperparameters for training the density-based spatial clustering of applications with noise (DBSCAN) model; (b) generating, by the one or more hardware processors, one or more first clustering models to automatically group the one or more first transactions comprising one or more analogical characteristics, based on the selected one or more first hyperparameters; (d) scanning, by the one or more hardware processors, the grouped one or more first transactions comprising the one or more analogical characteristics, with the one or more first data points to identify at least one of: the one or more first dense regions as the one or more clusters and one or more isolated first data points as the one or more noises; (e) determining, by the one or more hardware processors, one or more pairwise distances between the one or more first data points; (f) determining, by the one or more hardware processors, whether the one or more first data points satisfy a predetermined criteria of the one or more first hyperparameters; and (g) classifying, by the one or more hardware processors, the one or more first data points as at least one of: one or more first core data points indicating the one or more clusters, one or more first border data points, and one or more first noise data points indicating the one or more noises.

The one or more first hyperparameters comprise at least one of: epsilon hyperparameter and minimum samples hyperparameter. The epsilon hyperparameter indicates a radius within which one or more first data points are indicated as one or more neighbors. The 'minimum samples' hyperparameter is configured to generate one or more first dense regions by determining a predetermined number of the one or more first data points required within the radius.

In yet another embodiment, the ML-based computing method further comprises validating, by the one or more hardware processors, the density-based spatial clustering of applications with noise (DBSCAN) model based on one or more validation datasets, by: (a) determining, by the one or more hardware processors, whether one or more first results of the one or more clusters associated with the one or more first transactions satisfy one or more first predetermined threshold results; and (b) performing, by the one or more hardware processors, one or more first processes comprising at least one of: preprocessing of the one or more training datasets associated with at least one of: the one or more first data and the one or more features, adjusting of at least one of: the one or more first data and the one or more features, and adjusting of the one or more first hyperparameters, until the one or more first results of the one or more clusters associated with the one or more first transactions satisfy the one or more first predetermined threshold results.

In yet another embodiment, the ML-based computing method further comprises training, by the one or more hardware processors, the one or more clustering based machine learning models comprising a K-nearest neighbor (KNN) model, by: (a) receiving, by the one or more hardware processors, the one or more training datasets associated with at least one of: the one or more first data associated with the one or more first transactions and the one or more features associated with the one or more transaction categories; (b) selecting, by the one or more hardware processors, one or more second hyperparameters for training the K-nearest neighbor (KNN) model; (c) generating, by the one or more hardware processors, one or more second clustering models to automatically group the one or more first transactions comprising the one or more analogical characteristics, based on the selected one or more second hyperparameters; (d) scanning, by the one or more hardware processors, the grouped one or more first transactions comprising the one or more analogical characteristics, with one or more second data points to identify at least one of: one or more second dense regions as the one or more clusters and one or more second isolated data points as the one or more noises; (e) determining, by the one or more hardware processors, one or more distances between the one or more second data points by the distance metric hyperparameter; (f) identifying, by the one or more hardware processors, one or more nearest neighbors based on the determined one or more distances between the one or more second data points; and (g) assigning, by the one or more hardware processors, one or more labels to the one or more nearest neighbors based on a classification of the one or more nearest neighbors.

The one or more second hyperparameters comprise at least one of: one or more nearest neighbors hyperparameter, distance metric hyperparameter, weight function hyperparameter, leaf size hyperparameter, Minkowski distance metric hyperparameter, standardization hyperparameter, and N_jobs hyperparameter.

In yet another embodiment, the ML-based computing method further comprises validating, by the one or more hardware processors, the K-nearest neighbor (KNN) model based on the one or more validation datasets, by: (a) determining, by the one or more hardware processors, whether one or more second results of the one or more clusters associated with the one or more first transactions satisfy one or more second predetermined threshold results; and (b) performing, by the one or more hardware processors, one or more second processes comprising at least one of: preprocessing of the one or more training datasets associated with at least one of: the one or more first data and the one or more features, adjusting of at least one of: the one or more first data and the one or more features, and adjusting of the one or more second hyperparameters, until the one or more second results of the one or more clusters associated with the one or more first transactions satisfy the one or more second predetermined threshold results.

In yet another embodiment, the ML-based computing method further comprises re-training, by the one or more hardware processors, the one or more machine learning models over a plurality of time intervals based on one or more training data, by: (a) receiving, by the one or more hardware processors, the one or more training data associated with the one or more first transactions over the plurality of time intervals; (b) adding, by the one or more hardware processors, the one or more training data with the one or more training datasets to generate one or more updated training datasets; (c) re-training, by the one or more hardware processors, the one or more machine learning models based on the one or more updated training datasets; and (d) executing, by the one or more hardware processors, the re-trained one or more machine learning models in a transaction category identification subsystem to identify the one or more first transaction categories.

In one aspect, a machine learning based (ML-based) computing system for identifying one or more transaction categories from one or more coded enterprise resource planning (ERP) data, is disclosed. The ML-based computing system includes one or more hardware processors and a memory coupled to the one or more hardware processors. The memory includes a plurality of subsystems in the form of programmable instructions executable by the one or more hardware processors.

The plurality of subsystems comprises an input receiving subsystem configured to receive one or more inputs from one or more electronic devices associated with one or more first users. The one or more inputs comprise one or more first information related to at least one of: one or more entities associated with one or more second users and one or more transaction datasets.

The plurality of subsystems further comprises a data retrieval subsystem configured to retrieve one or more first data associated with one or more first transactions from one or more databases, based on the one or more inputs received from the one or more electronic devices associated with the one or more first users. The one or more first data associated with the one or more first transactions comprise at least one of: one or more document types, one or more posting keys, one or more posting dates, one or more clearing dates, one or more amounts, one or more document numbers, one or more clearing documents, and a combination of the one or more documents types and the one or more posting keys.

The plurality of subsystems further comprises a feature generation subsystem configured to generate one or more features associated with the one or more transaction categories based on the one or more first data associated with the one or more first transactions. The one or more features associated with the one or more transaction categories comprise at least one of: one or more cleared by features, one or more cleared together features, and one or more generated by features.

The plurality of subsystems further comprises a transaction category identification subsystem configured to: (a) identify one or more first transaction categories based on at least one of: the one or more first data associated with the one or more first transactions and the one or more features associated with the one or more transaction categories, by one or more clustering based machine learning models; and (b) identify one or more second transaction categories based on one or more pre-configured rules. The one or more second transaction categories are unidentified transaction categories by the one or more clustering based machine learning models during identification of the one or more first transaction categories.

The plurality of subsystems further comprises an output subsystem configured to provide an output of at least one of: the one or more first transaction categories and the one or more second transaction categories, to the one or more first users on one or more user interfaces associated with the one or more electronic devices.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 4A is an exemplary tabular view depicting one or more retrieved data associated with one or more first transactions, in accordance with an embodiment of the present disclosure;

FIG. 4B is an exemplary tabular view depicting the one or more transaction categories identified for the one or more retrieved data associated with the one or more first transactions, such as those shown in FIG. 4A, in accordance with an embodiment of the present disclosure.

Figure 1:
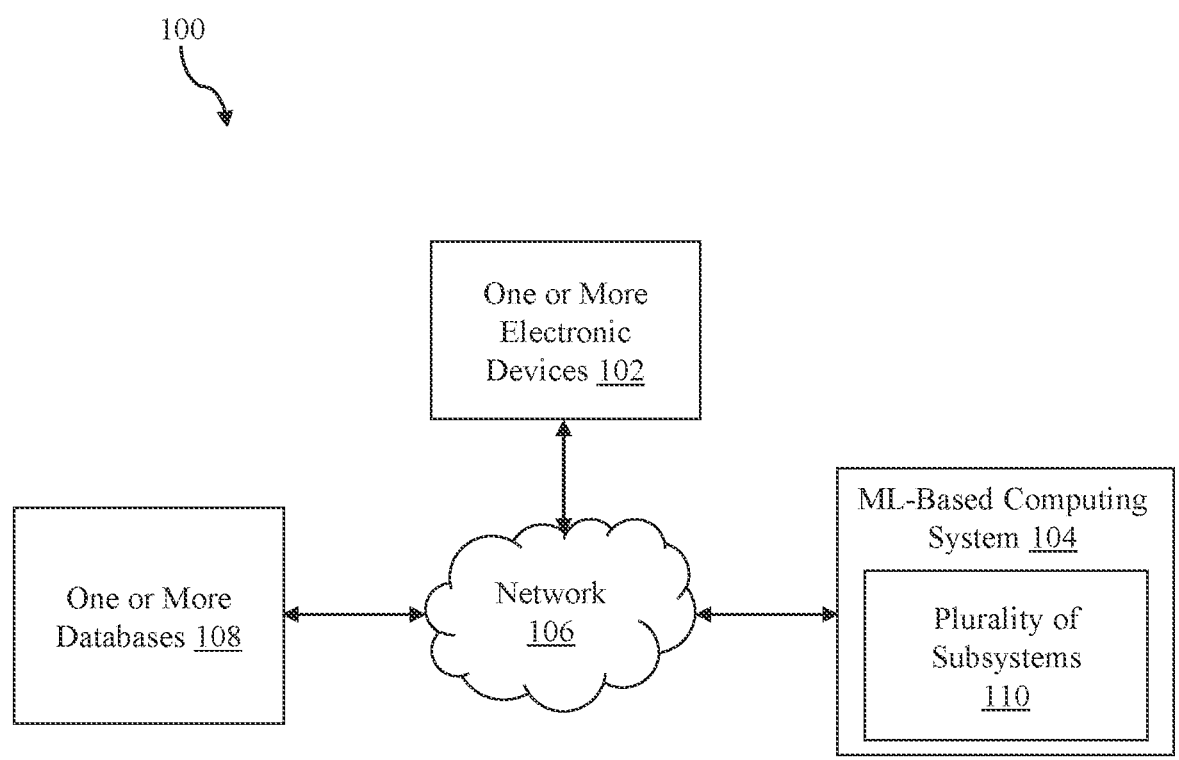
FIG. 1 is a block diagram illustrating a computing environment with a machine learning based (ML-based) computing system for identifying one or more transaction categories from one or more coded enterprise resource planning (ERP) data, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 is a block diagram illustrating a computing environment 100 with a machine learning based (ML-based) computing system 104 for identifying one or more transaction categories from one or more coded enterprise resource planning (ERP) data, in accordance with an embodiment of the present disclosure. According to FIG. 1, the computing environment 100 includes one or more electronic devices 102 that are communicatively coupled to the ML-based computing system 104 through a network 106. The one or more electronic devices 102 through which one or more first users provide one or more inputs to the ML-based computing system 104.

In an embodiment, the one or more first users may include at least one of: one or more data analysts, one or more business analysts, one or more cash analysts, one or more financial analysts, one or more collection analysts, one or more debt collectors, one or more professionals associated with cash and collection management, and the like.

The present invention is configured to automatically provide identified one or more first transaction categories and one or more second transaction categories (e.g., one or more transaction categories which are not identified by one or more clustering based machine learning models) to the one or more first users through the one or more electronic devices 102. The ML-based computing system 104 is initially configured to receive one or more inputs from the one or more electronic devices 102 associated with the one or more first users. In an embodiment, the one or more inputs include one or more first information related to at least one of: one or more entities associated with one or more second users and one or more transaction datasets.

In an embodiment, the one or more entities associated with the one or more second users may include at least one of: one or more customers, one or more organizations, one or more corporations, one or more parent companies, one or more subsidiaries, one or more joint ventures, one or more partnerships, one or more governmental bodies, one or more associations, one or more legal entities, and the like.

The ML-based computing system 104 is further configured to retrieve one or more first data associated with one or more first transactions from one or more databases 108, based on the one or more inputs received from the one or more electronic devices 102 associated with the one or more first users. The one or more first data associated with the one or more first transactions may include at least one of: one or more document types, one or more posting keys, one or more posting dates, one or more clearing dates, one or more amounts, one or more document numbers, one or more clearing documents, and a combination of the one or more documents types and the one or more posting keys. In an embodiment, at least one of: the one or more inputs including one or more first information and the one or more first data associated with the one or more first transactions, may be encrypted and decrypted by the ML-based computing system 104 so that one or more third party users cannot be authenticated to manipulate at least one of: the one or more first information and the one or more first data.

The ML-based computing system 104 is further configured to generate one or more features associated with the one or more transaction categories based on the one or more first data associated with the one or more first transactions. The one or more features associated with the one or more transaction categories may include at least one of: one or more cleared by features, one or more cleared together features, and one or more generated by features.

The ML-based computing system 104 is further configured to identify the one or more first transaction categories based on at least one of: the one or more first data associated with the one or more first transactions and the one or more features associated with the one or more transaction categories, by one or more clustering based machine learning models. The ML-based computing system 104 is further configured to identify the one or more second transaction categories based on one or more pre-configured rules. The one or more second transaction categories are unidentified transaction categories during identification of the one or more first transaction categories.

The ML-based computing system 104 is further configured to provide an output of at least one of: the one or more first transaction categories and the one or more second transaction categories, to the one or more first users on one or more user interfaces associated with the one or more electronic devices 102.

The ML-based computing system 104 may be hosted on a central server including at least one of: a cloud server or a remote server. In an embodiment, the ML-based computing system 104 may include at least one of: a user device, a server computer, a server computer over the network 106, a cloud-based computing system, a cloud-based computing system over the network 106, a distributed computing system, and the like.

Further, the network 106 may be at least one of: a Wireless-Fidelity (Wi-Fi) connection, a hotspot connection, a Bluetooth connection, a local area network (LAN), a wide area network (WAN), any other wireless network, and the like. In an embodiment, the one or more electronic devices 102 may include at least one of: a laptop computer, a desktop computer, a tablet computer, a Smartphone, a wearable device, a Smart watch, and the like.

Further, the computing environment 100 includes the one or more databases 108 communicatively coupled to the ML-based computing system 104 through the network 106. In an embodiment, the one or more databases 108 include at least one of: one or more relational databases, one or more object-oriented databases, one or more data warehouses, one or more cloud-based databases, and the like. In another embodiment, a format of the one or more first data retrieved from the one or more databases 108 may include at least one of: a comma-separated values (CSV) format, a JavaScript Object Notation (JSON) format, an Extensible Markup Language (XML), spreadsheets, and the like. Furthermore, the one or more electronic devices 102 include at least one of: a local browser, a mobile application, and the like.

Furthermore, the one or more first users may use a web application through the local browser, the mobile application to communicate with the ML-based computing system 104. In an embodiment of the present disclosure, the ML-based computing system 104 includes a plurality of subsystems 110. Details on the plurality of subsystems 110 have been elaborated in subsequent paragraphs of the present description with reference to FIG. 2.

Figure 2:
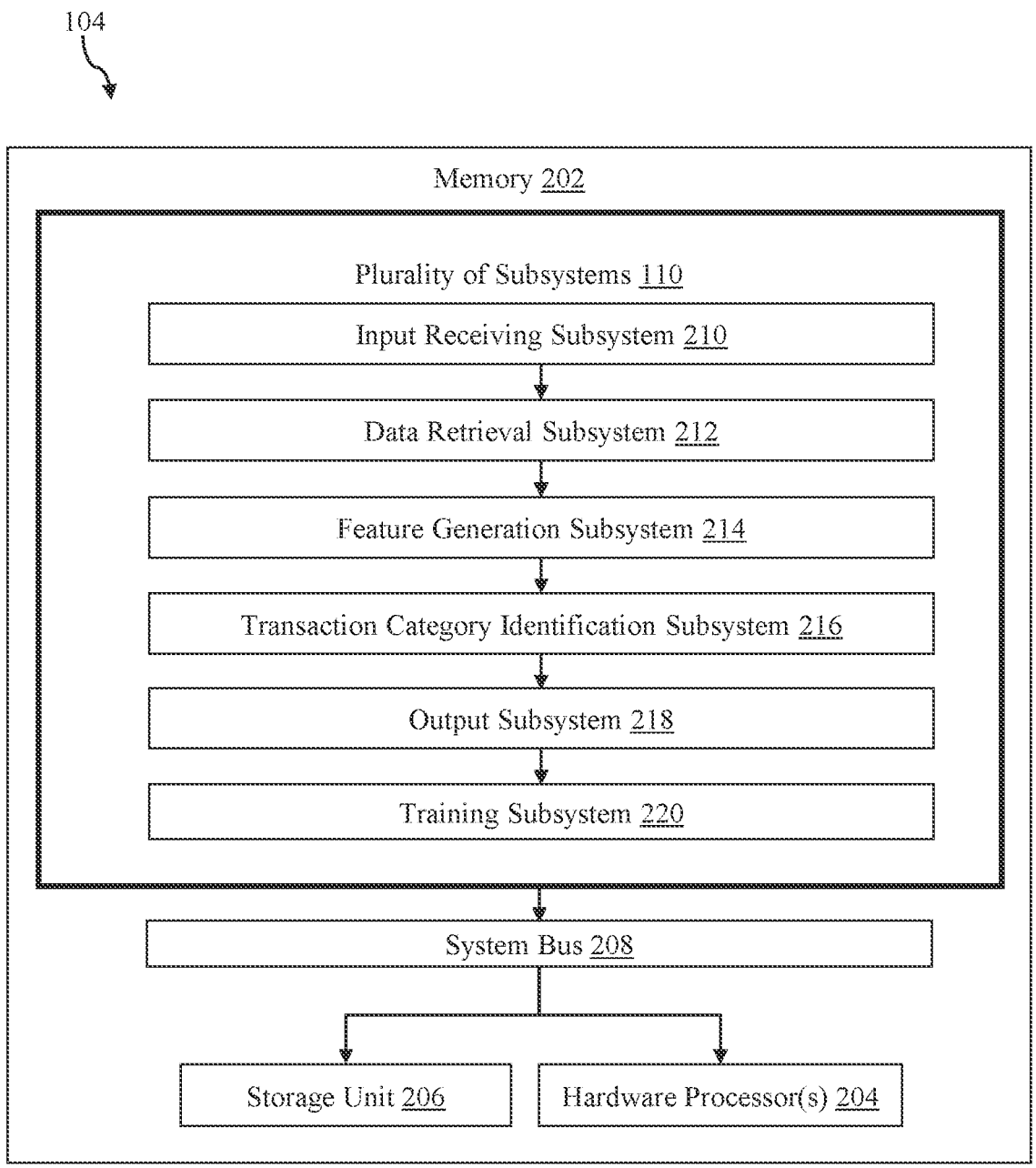
FIG. 2 is a detailed view of the ML-based computing system for identifying the one or more transaction categories from the one or more coded enterprise resource planning (ERP) data, in accordance with another embodiment of the present disclosure.

FIG. 2 is a detailed view of the ML-based computing system 104 for identifying the one or more transaction categories from the one or more coded enterprise resource planning (ERP) data, in accordance with another embodiment of the present disclosure. The ML-based computing system 104 includes a memory 202, one or more hardware processors 204, and a storage unit 206. The memory 202, the one or more hardware processors 204, and the storage unit 206 are communicatively coupled through a system bus 208 or any similar mechanism. The memory 202 includes the plurality of subsystems 110 in the form of programmable instructions executable by the one or more hardware processors 204.

The plurality of subsystems 110 includes an input receiving subsystem 210, a data retrieval subsystem 212, a feature generation subsystem 214, a transaction category identification subsystem 216, an output subsystem 218, and a training subsystem 220. The brief details of the plurality of subsystems 110 have been elaborated in a below table.

| Plurality of Subsystems 110 | Functionality |
|---|---|
| Input receiving subsystem 210 | The input receiving subsystem 210 is configured to receive the one or more inputs from the one or more electronic devices 102 associated with the one or more first users. |
| Data retrieval subsystem 212 | The data retrieval subsystem 212 is configured to retrieve the one or more first data associated with the one or more first transactions from the one or more databases 108, based on the one or more inputs received from the one or more electronic devices 102 associated with the one or more first users. |
| Feature generation subsystem 214 | The feature generation subsystem 214 is configured to generate the one or more features associated with the one or more transaction categories based on the one or more first data associated with the one or more first transactions. The feature generation subsystem 214 is further configured to group the one or more first transactions based on at least one of: the one or more cleared by features, one or more cleared together features, and the one or more generated by features. |
| Transaction category identification subsystem 216 | The transaction category identification subsystem 216 is configured to identify the one or more first transaction categories based on at least one of: the one or more first data associated with the one or more first transactions and the one or more features associated with the one or more transaction categories, by the one or more clustering based machine learning models.<br>The transaction category identification subsystem 216 is further configured to identify the one or more second transaction categories based on the one or more pre-configured rules. The one or more second transaction categories are unidentified transaction categories by the one or more clustering based machine learning models during identification of the one or more first transaction categories. |
| Output Subsystem 218 | The output subsystem 218 is configured to provide the output of at least one of: the one or more first transaction categories and the one or more second transaction categories, to the one or more first users on the one or more user interfaces associated with the one or more electronic devices 102. |
| Training subsystem 220 | The training subsystem 220 is configured to re-train the one or more clustering based machine learning models over a plurality of time intervals with one or more training data. |

The one or more hardware processors 204, as used herein, means any type of computational circuit, including, but not limited to, at least one of: a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 204 may also include embedded controllers, including at least one of: generic or programmable logic devices or arrays, application specific integrated circuits, single-chip computers, and the like.

The memory 202 may be non-transitory volatile memory and non-volatile memory. The memory 202 may be coupled for communication with the one or more hardware processors 204, being a computer-readable storage medium. The one or more hardware processors 204 may execute machine-readable instructions and/or source code stored in the memory 202. A variety of machine-readable instructions may be stored in and accessed from the memory 202. The memory 202 may include any suitable elements for storing data and machine-readable instructions, including at least one of: read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes the plurality of subsystems 110 stored in the form of machine-readable instructions on any of the above-mentioned storage media and may be in communication with and executed by the one or more hardware processors 204.

The storage unit 206 may be a cloud storage, a Structured Query Language (SQL) data store, a noSQL database or a location on a file system directly accessible by the plurality of subsystems 110.

The plurality of subsystems 110 includes the input receiving subsystem 210 that is communicatively connected to the one or more hardware processors 204. The input receiving subsystem 210 is configured to receive the one or more inputs from the one or more electronic devices 102 associated with one or more first users. In an embodiment, the one or more inputs may include the one or more first information related to at least one of: the one or more entities associated with the one or more second users and the one or more transaction datasets retrieved from the one or more enterprise resource planning (ERP) platforms.

In an embodiment, the one or more transaction datasets retrieved from the one or more enterprise resource planning (ERP) platforms may indicate one or more structured compilations of one or more second data comprising at least one of: one or more financial data, of the one or more organizations or systems. In another embodiment, the one or more transaction datasets may include one or more financial events comprising one or more second information related to at least one of: one or more purchases, one or more sales, one or more payments, one or more investments, one or more loans, involvement of the one or more first users and the one or more second users, one or more amounts transacted, dates and times, one or more transaction types, and other pertinent details related to one or more financial activities.

In an embodiment, the one or more first users may include at least one of: the one or more data analysts, the one or more business analysts, the one or more cash analysts, the one or more financial analysts, the one or more collection analysts, the one or more debt collectors, the one or more professionals associated with the cash and collection management, and the like. In an embodiment, the one or more entities associated with the one or more second users may include at least one of: the one or more customers, the one or more organizations, the one or more corporations, the one or more parent companies, the one or more subsidiaries, the one or more joint ventures, the one or more partnerships, the one or more governmental bodies, the one or more associations, the one or more legal entities, and the like.

The plurality of subsystems 110 includes the data retrieval subsystem 212 that is communicatively connected to the one or more hardware processors 204. The data retrieval subsystem 212 is configured to retrieve the one or more first data associated with the one or more first transactions from the one or more databases 108, based on the one or more inputs received from the one or more electronic devices 102 associated with the one or more first users. In an embodiment, the one or more first data associated with the one or more first transactions may include at least one of: the one or more document types, the one or more posting keys, the one or more posting dates, the one or more clearing dates, the one or more amounts, the one or more document numbers, the one or more clearing documents, and the combination of the one or more documents types and the one or more posting keys.

In an embodiment, the one or more document types (doctype) are one or more alphabetical values that signify the one or more transaction types of records. As a non-limiting example, RF may represent one or more financial documents, RE may represent one or more invoice receipts, AB may represent one or more accounting documents, and the like. The one or more document types determine one or more number ranges and one or more account types that can be posted. In another embodiment, the one or more posting keys (PostingKey) are one or more numerical values that signify the one or more transaction types of the records. As a non-limiting example, a numerical value 40 may represent a debit entry, a numerical value 50 may represent a credit entry, a numerical value 31 may represent a customer invoice, a numerical value 21 may represent a vendor credit memo, and the like.

In yet another embodiment, the one or more posting dates are one or more dates on which the one or more records were introduced to the ERP system. The one or more posting dates are used to determine the fiscal year and a period for the one or more records. The one or more posting dates can be different from the one or more document dates or one or more entry dates. In yet another embodiment, the one or more clearing dates are the one or more dates on which the one or more records were closed or applied. As a non-limiting example, when the one or more customers pay an invoice, the one or more clearing dates are the date of payment. The one or more clearing dates are generally used to determine the due date and the payment terms for the one or more records.

In yet another embodiment, the one or more amounts are one or more invoice amounts related to the one or more records, the one or more amounts are usually expressed in a local currency of a company code or a document currency of the one or more records. The one or more amounts can be at least one of: positive and negative values, depending on the one or more transaction types. In yet another embodiment, the one or more document numbers are unique identities assigned to each record. The one or more document numbers may include at least of: a company code, a fiscal year, and a sequential number. The one or more document numbers are used to identify and retrieve the one or more records in the system.

In yet another embodiment, the one or more clearing documents are the one or more document numbers of the one or more records that are used to clear a record. As a non-limiting example, when the one or more customers pay one or more invoices, the one or more clearing documents are the one or more document numbers of one or more payments. The one or more clearing documents are used to link the cleared record with the clearing record. In yet another embodiment, the combination of the one or more documents types and the one or more posting keys (Doc-Type-PostingKey) is an alphanumeric pair by combining the one or more document types and the one or more posting keys together, used to identify the one or more transaction types of the one or more records.

As a non-limiting example, RF40 stands for a financial document with a debit entry, RE50 stands for an invoice receipt with a credit entry, AB31 stands for an accounting document with a customer invoice, and the like. The doc-type-posting key pair is used to control one or more posting rules and validations for the one or more records. The combination of the Doctype and PostingKey is required in the ERP systems including the SAP because, the combination of the one or more documents types and the one or more posting keys is used to classify and control the accounting documents in different ways.

The one or more document types determine characteristics of one or more document headers including at least one of: the one or more number ranges, the one or more account types, one or more reversal document types, and one or more screen layouts. The one or more posting keys determine the characteristics of one or more line items including the one or more account types, one or more field statuses, one or more tax categories, and the debit or credit posting. The combination of the one or more documents types and the one or more posting keys ensures that one or more accounting documents are posted correctly and consistently according to the business transactions and the accounting principles.

In some embodiments, specific transaction data including at least one of: the one or more document types and the one or more posting keys, may be in coded formats. These coded formats may vary between one or more companies and may pose challenges in interpretation, requiring substantial human expertise to decipher and understand these codes for accurate analysis and utilization of the financial transaction information.

The plurality of subsystems 110 includes the feature generation subsystem 214 that is communicatively connected to the one or more hardware processors 204. The feature generation subsystem 214 is configured to generate the one or more features associated with the one or more transaction categories based on the one or more first data associated with the one or more first transactions. The feature generation subsystem 214 is further configured to group the one or more first transactions based on the one or more features being inputs for the one or more clustering based machine learning models. In an embodiment, the one or more features may include at least one of: the one or more cleared by features, the one or more cleared together features, and the one or more generated by features.

In an embodiment, the feature generation subsystem 214 is configured to generate one or more relationships between one or more combinations of document type and posting key pairs to group/cluster the one or more first transactions, based on the one or more cleared by features. For generating the one or more relationships between one or more combinations of document type and posting key pairs to group the one or more first transactions, the feature generation subsystem 214 is configured to determine whether a percentage of a first amount associated with a first combination of a first document type and posting key pair is cleared by a second amount associated with a second combination of a second document type and posting key pair. In an embodiment, the one or more combinations of the document type and posting key pairs may include at least one of: the first combination of the first document type and posting key pair and the second combination of the second document type and posting key pair.

The feature generation subsystem 214 is further configured to indicate the one or more relationships between the one or more combinations of the document type and posting key pairs when the first amount associated with the first combination of the first document type and posting key pair is determined to be cleared by the second amount associated with the second combination of the second document type and posting key pair. In an embodiment, a first clearing document associated with the first combination of the first document type and posting key pair is analogous to a second clearing document associated with the second combination of the second document type and posting key pair, to indicate that the one or more first transactions grouped by the one or more combinations of the document type and posting key pairs are mutually cleared against each of the one or more combinations of the document type and posting key pairs. The term "analogous" as used herein indicates a similarity or equivalence between the two sets of transactions and their corresponding clearing documents, emphasizing that they serve the same purpose or play a similar role in indicating that the transactions are mutually cleared against each of the specified combinations of document type and posting key pairs.

In another embodiment, the one or more clearing dates for the first combination of the first document type and posting key pair and the second combination of the second document type and posting key pair may be analogous. This ensures consistency in timing of the clearing event for the related one or more financial transactions. Although the one or more clearing documents share the analogous number, the original document numbers for the first combination of the first document type and posting key pair and the second combination of the second document type and posting key pair may be distinct. This maintains a clear distinction between original financial entries and clearing entries.

In a non-limiting example, a first combination of a first document type and posting key pair "RF40", indicating a financial document with a debit entry, and a second combination of a second document type and posting key pair "RE50", indicating an invoice receipt with a credit entry. If RF40 gets cleared by RE50, this implies that the amounts associated with the debit entry in the financial document (e.g., RF40) have been cleared by the credit entry in the invoice receipt (e.g., RE50). The phrase "cleared by" means that one document or transaction is used to settle or cancel another document or transaction. For example, if RF40 gets cleared by RE50, it means that the debit entry in RF40 is matched by the credit entry in RE50, and the net effect of both entries is zero. A clearing document for both combinations may share the same document number, and a clearing date may be identical. However, the original document numbers for RF40 and RE50 may remain distinct, maintaining a clear audit trail of the original financial transactions.

In another non-limiting example, the one or more combinations of the document type and posting key pairs "AB31" and "RF40". If AB31 is cleared by RF40, the cleared by feature is configured to signify a clearing relationship between an accounting document with a customer invoice (e.g., AB31) and a financial document with a debit entry (e.g., RF40). The clearing document associated with AB31 and RF40 may have the same document number and clearing date, indicating that the amounts in the customer invoice have been cleared by the debit entry in the financial document. Despite the shared clearing details, the original document numbers for AB31 and RF40 may remain distinct, ensuring traceability and transparency in the financial transaction history.

In another embodiment, the feature generation subsystem 214 is configured to obtain and quantify the one or more relationships between the one or more combinations of the document type and posting key pairs in the one or more first transactions, based on the one or more cleared together features. For quantifying the one or more relationships between the one or more combinations of the document type and posting key pairs in the one or more first transactions, the feature generation subsystem 214 is configured to determine whether a percentage of each unique combination of the one or more combinations of the document type and posting key pairs is cleared together with the one or more combinations of the document type and posting key pairs.

The feature generation subsystem 214 is further configured to indicate that the one or more clearing documents and the one or more clearing dates for the one or more combinations of the document type and posting key pairs, are analogous when the percentage of each unique combination of the one or more combinations of the document type and posting key pairs is determined to be cleared together with the one or more combinations of the document type and posting key pairs. In an embodiment, the one or more document numbers associated with the one or more first transactions may differ, emphasizing a distinct nature of each individual financial record.

In a non-limiting example, a sales document with the first combination of the first document type and posting key pair (e.g., Doctype-PostingKey) "RV01" is cleared together with another sales document using the posting key "DV02". The one or more cleared together features may highlight that the one or more first transactions share the analogous clearing document and clearing date, indicating that a portion of the total amount on both sales documents has been cleared together. Cleared together means that the sales documents are cleared in a single batch, without processing each document individually. Cleared together can help to reduce the number of clearing transactions and improve the efficiency of the clearing process.

In another non-limiting example, purchase orders with the first combination of the first document type and posting key pair "PO01" are processed with the different combinations of the document type and posting key pair having goods receipts with "GR03" and invoice receipts with "IR04". The one or more cleared together features may highlight that when the PO01 with goods receipt PostingKey GR03 is cleared together with another PO having the invoice receipts PostingKey IR04. The document type and posting key pairs may share the same clearing document and clearing date.

Despite having different document numbers, this reveals that a certain percentage of the total amount on these purchase orders has been cleared simultaneously.

In yet another embodiment, the feature generation subsystem 214 is configured to generate the one or more relationships between the one or more combinations of the document type and posting key pairs in the one or more first transactions, based on the one or more generated by features. The one or more generated by features play a crucial role in grouping the one or more first transactions within the financial system. For generating the one or more relationships between the one or more combinations of the document type and posting key pairs in the one or more first transactions, the feature generation subsystem 214 is configured to determine whether first transaction data associated with the first combination of the first document type and posting key pair is generated by second transaction data associated with the second combination of the second document type and posting key pair. The feature generation subsystem 214 is further configured to indicate one or more dependencies where a first transaction associated with the first combination of the first document type and posting key pair, is derived/linked to a second transaction associated with the second combination of the second document type and posting key pair, when the first transaction data are determined to be generated by the second transaction data.

In an embodiment, the one or more document numbers for both the first combination of the first document type and posting key pair and the second combination of the second document type and posting key pair, are identical, emphasizing a shared identity or association between the related transactions. However, the one or more clearing documents may differ between the two posting key combinations. Despite this distinction, the posting date remains consistent for both the first combination of the first document type and posting key pair and the second combination of the second document type and posting key pair.

In a non-limiting example, a sales transaction comprising the first combination of the first document type and posting key pair (e.g., DoctypePostingKey1) where a customer purchases a product, results in an issuance of an invoice with a document number ABC123. Subsequently, a return or refund with the second combination of the second document type and posting key pair (e.g., DoctypePostingKey2) is generated by an original sales transaction. The return transaction shares the same document number ABC123 as an initial sale, indicating that it is generated by the original purchase. Although the return has a different clearing document, denoted as LMN789, the posting date remains consistent to reflect the timing of the return in relation to the original sale.

In another non-limiting example, a company issues an advance payment (e.g., DoctypePostingKey3) to a vendor for future services, creating an initial transaction with the document number DEF789 and a corresponding clearing document PQR321. Later on, as the vendor completes the services, an invoice (e.g., DoctypePostingKey4) is generated based on the advance payment. This invoice shares the document number DEF789 with the initial advance payment, signifying the relationship between the two transactions.

The plurality of subsystems 110 includes the transaction category identification subsystem 216 that is communicatively connected to the one or more hardware processors 204. The transaction category identification subsystem 216 is configured to dynamically identify the one or more first transaction categories based on at least one of: the one or more first data associated with the one or more first transactions and the one or more features associated with the one or more transaction categories, by the one or more clustering based machine learning models. The transaction category identification subsystem 216 is configured to dynamically assign the one or more transaction categories to the one or more transactions to identify the one or more first transaction categories by the one or more clustering based machine learning models.

In an embodiment, the one or more first transaction categories may include at least one of: one or more primary invoices, one or more primary payments, one or more secondary invoices, one or more secondary payments, one or more adjustments, one or more invoice reversals, one or more payment reversals, one or more credit memos, one or more debit memos, one or more deductions, and the like.

In an embodiment, the one or more primary invoices are one or more documents issued by one or more sellers to one or more buyers, indicating one or more products or services provided, one or more quantities, and one or more agreed-upon prices. In a non-limiting example, ABC Electronics issues a primary invoice to XYZ Retail for 100 laptops at $1,000 each, totaling $100,000. In an embodiment, the one or more primary payments are one or more initial payments made by the one or more buyers to the one or more sellers in response to the one or more primary invoices, completing a first phase of the one or more first transactions. In a non-limiting example, the XYZ Retail makes a primary payment of $100,000 to the ABC Electronics for the 100 laptops as per the one or more primary invoices.

In an embodiment, the one or more secondary invoices are follow-up invoices issued after the one or more primary invoices, often for additional products, services, or adjustments to the initial transaction. In a non-limiting example, the ABC Electronics issues a secondary invoice to the XYZ Retail for an additional 20 laptops at $1,000 each, totaling $20,000. In an embodiment, the one or more secondary payments are one or more payments made in response to the one or more secondary invoices, completing a second phase of the one or more first transactions or addressing additional charges or changes. In a non-limiting example, the XYZ Retail makes a secondary payment of $20,000 to the ABC Electronics for the additional 20 laptops as per the one or more secondary invoices.

In an embodiment, the one or more adjustments are one or more modifications made to an invoice or payment due to changes in the initial agreement, including at least one of: corrections, discounts, and other adjustments. In a non-limiting example, the ABC Electronics adjusts the invoice to include a 5% discount on the total amount as a goodwill gesture, resulting in a $5,000 adjustment. In an embodiment, the one or more invoice reversals are cancellation or voiding of a previously issued invoice, typically due to errors or the need to make corrections. In a non-limiting example, the ABC Electronics realizes an error in the one or more primary invoices and issues an invoice reversal to correct the mistake.

In an embodiment, the one or more payment reversals are the reversal or cancellation of a payment that was previously made, often done to correct errors or address issues with the initial payment. In a non-limiting example, the XYZ Retail identifies an overpayment and requests a payment reversal from the ABC Electronics to correct the excess amount. In an embodiment, the one or more credit memos are one or more documents issued by the one or more sellers to the one or more buyers, indicating a reduction in the amount owed due to returns, discounts, or other adjustments. In a non-limiting example, the ABC Electronics issues a credit memo to the XYZ Retail for $2,000 as a credit for returned defective laptops.

In an embodiment, the one or more debit memos are one or more documents issued by the one or more sellers to the one or more buyers, indicating an increase in the amount owed, often due to additional charges or corrections. In a non-limiting example, the ABC Electronics issues a debit memo to the XYZ Retail for $500, reflecting an additional charge for expedited shipping. In an embodiment, the one or more deductions are one or more reductions made to the amount payable by the one or more buyers, typically based on at least one of: agreed-upon terms, discounts, and adjustments. In a non-limiting example, the XYZ Retail deducts a previously agreed-upon 2% early payment discount from the total amount owed to the ABC Electronics, resulting in a $2,100 deduction.

In an embodiment, the one or more clustering based machine learning models used for the identification of the one or more first transaction categories may include at least one of: a density-based spatial clustering of applications with noise (DBSCAN) model, a K-nearest neighbor (KNN) model and a K-Means model. In an embodiment, the generation of different transaction category clusters is not a static activity. The ML-based computing system 104 and a ML-based computing method are configured to monitor transaction data from the one or more databases 108 or information sources described herein to upgrade the one or more clustering based machine learning models as the one or more clustering based machine learning models evolve through one or more time periods.

In certain embodiments, for training the transaction category identification subsystem 216, a dataset is prepared which comprises several input features. The dataset includes multiple input features, including, but not limited to the one or more first data associated with the one or more transactions and the one or more features associated with the one or more transaction categories. In one embodiment, the one or more features may be appropriately mapped to the output of a transaction cluster under a supervised learning approach as an aid in the training process. The dataset is shuffled and divided into training and validation datasets for training the one or more clustering based machine learning models. In certain embodiments, the one or more features are scaled or normalized to ensure stable training. In other embodiments, one or more anomalies are removed. In some embodiments, at least one of: outliers, errors, and mislabeled data, are removed or corrected to ensure that the datasets are robust for training.

In certain embodiments, the input dataset is subjected to feature scaling, which is a preprocessing technique used to transform numerical features in a dataset onto a common scale, ensuring that their magnitudes do not unfairly influence the outcome of the one or more clustering based machine learning models. Normalization is suitable when the one or more features have predefined ranges and are not susceptible to the outliers, while standardization is more robust to the outliers and well-suited for the one or more features with varying ranges. This above said process involves determining scaling parameters, including at least one of: minimum and maximum values, and mean and standard deviation, from the training data and then applying these parameters to both the training and test data. By performing feature scaling, the distances between data points become more meaningful and consistent, thereby enhancing the accuracy and stability of the transaction category identification subsystem 216.

The plurality of subsystems 110 includes the training subsystem 220 that is communicatively connected to the one or more hardware processors 204. The training subsystem 220 is configured to train the one or more clustering based machine learning models including the density-based spatial clustering of applications with noise (DBSCAN) model. For training the density-based spatial clustering of applications with noise (DBSCAN) model, the training subsystem 220 is initially configured to receive one or more training datasets associated with at least one of: the one or more first data associated with the one or more first transactions and the one or more features associated with the one or more transaction categories.

The training subsystem 220 is further configured to select one or more first hyperparameters for training the density-based spatial clustering of applications with noise (DBSCAN) model. In an embodiment, the one or more first hyperparameters may include at least one of: epsilon hyperparameter and minimum samples hyperparameter. The epsilon hyperparameter indicates a radius within which one or more first data points are indicated as one or more neighbors. The minimum samples hyperparameter is configured to generate one or more first dense regions by determining a predetermined number of the one or more first data points required within the radius.

The training subsystem 220 is further configured to generate one or more first clustering models to automatically group the one or more first transactions including one or more analogical characteristics, based on the selected one or more first hyperparameters. The training subsystem 220 is further configured to scan the grouped one or more first transactions including the one or more analogical characteristics, with the one or more first data points to identify at least one of: the one or more first dense regions as the one or more clusters and one or more isolated first data points as the one or more noises.

In an embodiment, during training, the training subsystem 220 is further configured to determine one or more pairwise distances between the one or more first data points. The training subsystem 220 is further configured to determine whether the one or more first data points satisfy a predetermined criteria of the one or more first hyperparameters. The training subsystem 220 is further configured to classify the one or more first data points as at least one of: one or more first core data points indicating the one or more clusters, one or more first border data points, and one or more first noise data points indicating the one or more noises.

As the algorithm progresses, the one or more clusters expand, and the one or more first data points are assigned to the appropriate clusters. The training process continues until the one or more first data points are assigned to the one or more clusters or labelled as the one or more noises. The outcome is a trained density-based spatial clustering of applications with noise (DBSCAN) model capable of efficiently capturing one or more transaction category clusters. In an embodiment, the training subsystem 220 is configured to validate and tune the density-based spatial clustering of applications with noise (DBSCAN) model in the transaction category identification subsystem 216. The evaluation and tuning of the density-based spatial clustering of applications with noise (DBSCAN) model involves assessing the quality of the generated clusters and iteratively improving the results if necessary. In another embodiment, the tuning of the one or more first hyperparameters is performed to determine the optimal combination of hyperparameter values that yields the best transaction category results.

Since the density-based spatial clustering of applications with noise (DBSCAN) model does not require ground truth labels, the evaluation is often performed using internal clustering metrics including at least one of: silhouette score determining a separation between the one or more clusters, and Davies-Bouldin index quantifying cluster dispersion. These clustering metrics provide insights into the compactness and separation of the one or more clusters. In certain embodiment, to fine-tune the density-based spatial clustering of applications with noise (DBSCAN) model in the transaction category identification subsystem 216, in the training phase, the one or more first transaction categories are determined for the one or more clusters generated by the transaction category identification subsystem 216. Thereafter, the one or more first transaction categories determined for the one or more clusters are compared to the one or more ground truth labels. The one or more first data associated with the one or more first transactions and the one or more features associated with the one or more transaction categories and the one or more first hyperparameters combination for the one or more clusters associated with the one or more first transactions, which shows that highest accuracy and lowest volatility is selected for clustering in future cycles of the transaction category identification subsystem 216.

The training subsystem 220 is further configured to validate the density-based spatial clustering of applications with noise (DBSCAN) model based on the one or more validation datasets. For validating the density-based spatial clustering of applications with noise (DBSCAN) model, the training subsystem 220 is configured to determine whether one or more first results of the one or more clusters associated with the first transactions satisfy one or more first predetermined threshold results. The training subsystem 220 is further configured to perform one or more first processes comprising at least one of: preprocessing of the one or more training datasets associated with at least one of: the one or more first data and the one or more features, adjusting of at least one of: the one or more first data and the one or more features, and adjusting of the one or more first hyperparameters, until the one or more first results of the one or more clusters associated with the one or more first transactions satisfy the one or more first predetermined threshold results. In an embodiment, iterative refinement of the one or more first processes ensures that the transaction category identification subsystem 216 aligns more closely with the true distribution of the data.

The training subsystem 220 is further configured to train the one or more clustering based machine learning models including the K-nearest neighbor (KNN) model. For training the K-nearest neighbor (KNN) model, the training subsystem 220 is initially configured to receive the one or more training datasets associated with at least one of: the one or more first data associated with the one or more first transactions and the one or more features associated with the one or more transaction categories. The training subsystem 220 is further configured to select one or more second hyperparameters for training the K-nearest neighbor (KNN) model. The one or more second hyperparameters my include at least one of: one or more nearest neighbor hyperparameters, distance metric hyperparameter, weight function hyperparameter, leaf size hyperparameter, Minkowski distance metric hyperparameter, standardization hyperparameter, and N_jobs hyperparameter.

The one or more nearest neighbor hyperparameters are configured to determine how many surrounding second data points are considered when making predictions. In an embodiment, typical values range from 3 to 10. The distance metric hyperparameter is configured to define how distance between two data points is determined, based on at least one of: Euclidean, Manhattan, Minkowski, Hamming, and the like. The weight function hyperparameter is configured to decide how much weight each neighbor should have in predicting the cluster label. In an embodiment, the one or more second data points may have uniform weights while distance-based weights closer neighbors have more heavy weights.

The leaf size hyperparameter is configured to speed up neighbor searches for large datasets by clustering data into one or more leaves. The Minkowski distance metric hyperparameter is configured to provide Manhattan distance when p=1, and to provide familiar Euclidean distance when p=2. The standardization hyperparameter is configured to determine whether to standardize the one or more features to include mean of zero and variance of one. The N_jobs hyperparameter is a number of parallel jobs to run while searching for the one or more neighbors.

The training subsystem 220 is further configured to generate one or more second clustering models to automatically group the one or more first transactions including the one or more analogical characteristics, based on the selected one or more second hyperparameters. The training subsystem 220 is further configured to scan the grouped one or more first transactions including the one or more analogical characteristics, with one or more second data points to identify at least one of: one or more second dense regions as the one or more clusters and one or more second isolated data points as the one or more noises.

The training subsystem 220 is further configured to determine one or more distances between the one or more second data points by the distance metric hyperparameter. The training subsystem 220 is further configured to identify one or more nearest neighbors based on the determined one or more distances between the one or more second data points. The training subsystem 220 is further configured to assign one or more labels to the one or more nearest neighbors based on a classification of the one or more nearest neighbors. This iterative process is repeated for the one or more second data points in the one or more training datasets. Subsequently, the trained K-nearest neighbor (KNN) model's performance is evaluated using the test set. The metrics including at least one of: accuracy, precision, recall, and F1-score, are determined to assess the clustering quality.

The evaluation and tuning of the K-nearest neighbor (KNN) model involves assessing the quality of the generated clusters and iteratively improving the results if necessary. In certain embodiments, the tuning of the one or more second hyperparameters is performed to determine the optimal combination of hyperparameter values that yields the best transaction category results.

In certain embodiments, the K-nearest neighbor (KNN) model is evaluated by at least one of: a grid search and a random search, to explore different combinations of hyperparameter values. This involves training and evaluating the K-nearest neighbor (KNN) model with one or more settings to identify the configuration that yields the best clustering results. The iterative process of refining the one or more second hyperparameters and assessing K-nearest neighbor (KNN) model's performance continues until an optimal configuration is reached. This trained K-nearest neighbor (KNN) model can then be deployed to generate distinct employee clusters based on the provided features. In certain embodiment, to fine-tune the K-nearest neighbor (KNN) model in the transaction category identification subsystem 216, in the training phase, the one or more first transaction categories are determined for one or more clusters generated by the transaction category identification subsystem 216. Thereafter, the one or more first transaction categories determined for the one or more clusters are compared to the one or more ground truth labels. The one or more first data associated with the one or more first transactions and the one or more features associated with the one or more transaction categories and the one or more first hyperparameters combination for the one or more clusters associated with the one or more first transactions, which shows that highest accuracy and lowest volatility is selected for clustering in future cycles of the transaction category identification subsystem 216.

The training subsystem 220 is further configured to validate the K-nearest neighbor (KNN) model based on the one or more validation datasets. For validating the K-nearest neighbor (KNN) model, the training subsystem 220 is configured to determine whether one or more second results of the one or more clusters associated with the one or more first transactions satisfy one or more second predetermined threshold results. The training subsystem 220 is further configured to perform one or more second processes including at least one of: preprocessing of the one or more training datasets associated with at least one of: the one or more first data and the one or more features, adjusting of at least one of: the one or more first data and the one or more features, and adjusting of the one or more second hyperparameters, until the one or more second results of the one or more clusters associated with the one or more first transactions satisfy the one or more second predetermined threshold results. In an embodiment, iterative refinement of the one or more second processes ensures that the transaction category identification subsystem 216 aligns more closely with the true distribution of the data.

In an embodiment, the training subsystem 220 is further configured to re-train the one or more machine learning models over a plurality of time intervals based on one or more training data. For re-training the one or more machine learning models, the training subsystem 220 is initially configured to receive the one or more training data associated with the one or more first transactions over the plurality of time intervals. The training subsystem 220 is further configured to add the one or more training data with the one or more training datasets to generate one or more updated training datasets. The training subsystem 220 is further configured to re-train the one or more machine learning models based on the one or more updated training datasets. The training subsystem 220 is further configured to execute the re-trained one or more machine learning models in the transaction category identification subsystem 216 to identify the one or more first transaction categories.

The transaction category identification subsystem 216 is further configured to identify one or more second transaction categories based on one or more pre-configured rules. The one or more second transaction categories are unidentified transaction categories by the one or more clustering based machine learning models during identification of the one or more first transaction categories. For identifying the one or more second transaction categories based on the one or more pre-configured rules, the transaction category identification subsystem 216 is configured to generate at least one of: one or more credit repositories (e.g., credit buckets) and one or more debit repositories (e.g., debit buckets).

In an embodiment, the one or more credit repositories comprise at least one of: one or more primary payments, one or more secondary payments, one or more payment reversals, one or more adjustments, one or more deductions, and the like. In another embodiment, the one or more debit repositories comprise at least one of: one or more primary invoices, one or more secondary invoices, one or more invoice reversals, one or more credit memos, one or more debit memos, and the like.

The transaction category identification subsystem 216 is further configured to generate one or more permutations and combinations of one or more second transactions (e.g., one or more untagged transactions) to minimize one or more differences between one or more values of the one or more credit repositories and the one or more debit repositories. The transaction category identification subsystem 216 is further configured to place/apply a combination of a untagged document type and posting key pair (e.g., untagged Doctype-PostingKey) in the one or more credit repositories and the one or more debit repositories, in one or more distributions in one or more iterations. The transaction category identification subsystem 216 is further configured to determine one or more differences between the one or more credit repositories and the one or more debit repositories, for each distribution in each iteration. The transaction category identification subsystem 216 is further configured to select the one or more distributions where the one or more differences between the one or more credit repositories and the one or more debit repositories provide a predetermined value (e.g., a least value).

The plurality of subsystems 110 includes the output subsystem 218 that is communicatively connected to the one or more hardware processors 204. The output subsystem 218 is configured to provide the output of at least one of: the one or more first transaction categories and the one or more second transaction categories, to the one or more first users on the one or more user interfaces associated with the one or more electronic devices 102.

Figure 3:
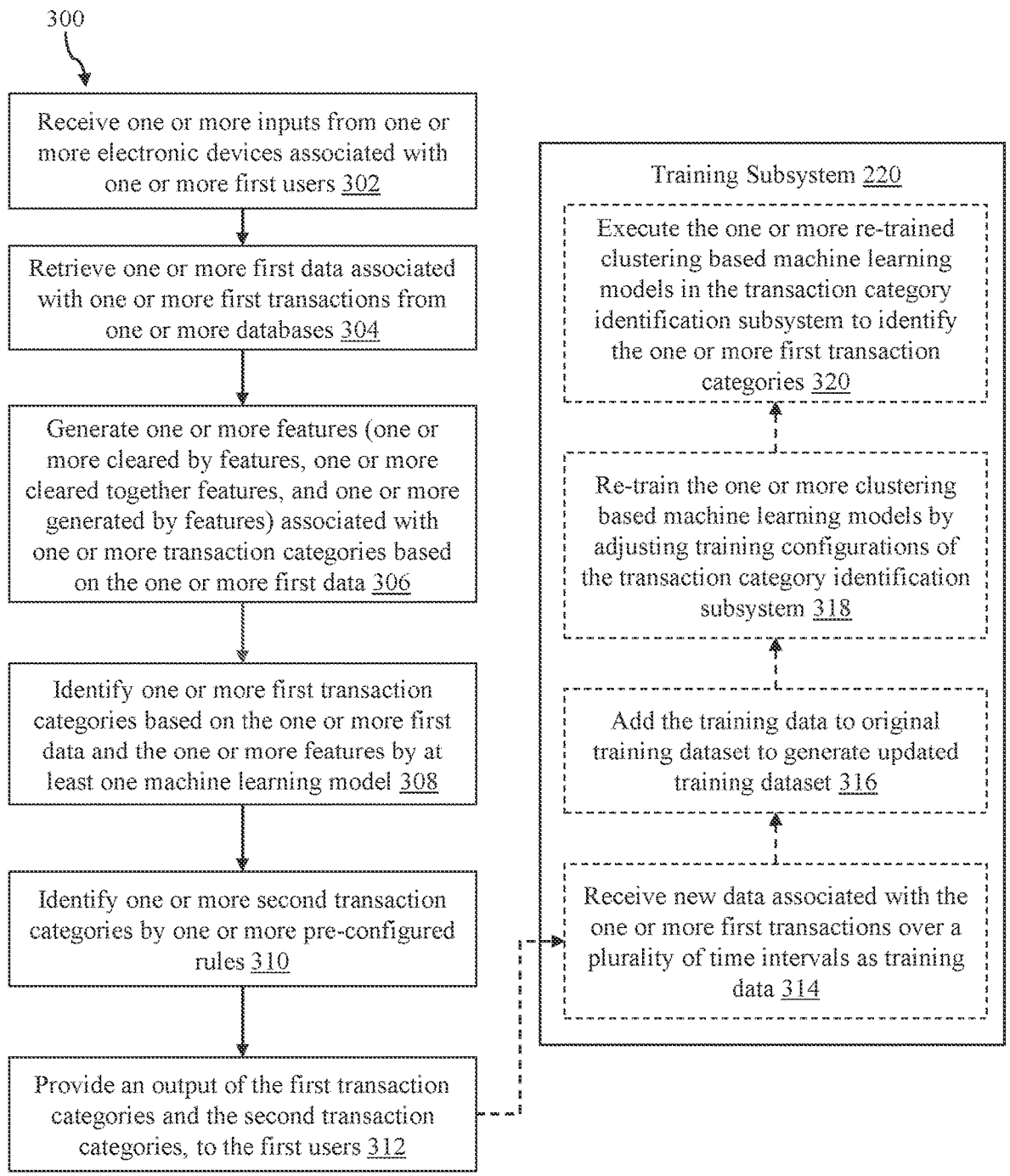
FIG. 3 is an overall process flow of automatic identification of the one or more transaction categories from the one or more coded enterprise resource planning (ERP) data, in accordance with another embodiment of the present disclosure.

FIG. 3 is an overall process flow 300 of automatic identification of the one or more transaction categories from the one or more coded enterprise resource planning (ERP) data, in accordance with another embodiment of the present disclosure. At step 302, the one or more inputs are received from the one or more electronic devices 102 associated with the one or more first users. The one or more inputs may include the one or more first information related to at least one of: the one or more entities associated with the one or more second users and the one or more transaction datasets retrieved from the one or more enterprise resource planning (ERP) platforms.

At step 304, the one or more first data associated with one or more first transactions are retrieved from the one or more databases 108, based on the one or more inputs received from the one or more electronic devices 102 associated with the one or more first users. In an embodiment, the one or more first data associated with the one or more first transactions may include at least one of: the one or more document types, the one or more posting keys, the one or more posting dates, the one or more clearing dates, the one or more amounts, the one or more document numbers, the one or more clearing documents, and a combination of the one or more documents types and the one or more posting keys.

At step 306, the one or more features associated with the one or more transaction categories are generated based on the one or more first data associated with the one or more first transactions. The one or more features associated with the one or more transaction categories may include at least one of: the one or more cleared by features, the one or more cleared together features, and the one or more generated by features.

At step 308, the one or more first transaction categories are identified/classified based on at least one of: the one or more first data associated with the one or more first transactions and the one or more features associated with the one or more transaction categories, by the one or more clustering based machine learning models.

At step 310, the one or more second transaction categories are identified/classified based on the one or more pre-configured rules. In an embodiment, the one or more second transaction categories are unidentified transaction categories by the one or more clustering based machine learning models during identification of the one or more first transaction categories.

At step 312, the output of at least one of: the one or more first transaction categories and the one or more second transaction categories, is provided to the one or more first users on the one or more user interfaces associated with the one or more electronic devices 102.

At step 314, the one or more training data associated with the one or more first transactions are received from the output subsystem 218, over the plurality of time intervals. At step 316, the one or more training data are added with the one or more training datasets to generate the one or more updated training datasets. At step 318, the one or more machine learning models are re-trained based on the one or more updated training datasets. At step 320, the re-trained one or more machine learning models are executed in the transaction category identification subsystem 216 to identify the one or more first transaction categories.

FIG. 4A is an exemplary tabular view 400A depicting one or more retrieved data associated with the one or more first transactions, in accordance with an embodiment of the present disclosure. The one or more retrieved data associated with the one or more first transactions, in FIG. 4A, depict at least one of: one or more document numbers 402, one or more clearing document numbers 404, one or more clearing dates 406, one or more document types 408, one or more posting keys 410, one or more posting dates 412, one or more amounts 414.

FIG. 4B is an exemplary tabular view 400B depicting the one or more transaction categories identified for the one or more retrieved data associated with the one or more first transactions, such as those shown in FIG. 4A, in accordance with an embodiment of the present disclosure. The one or more transaction categories 416 are identified based on the one or more one or more retrieved data associated with the one or more first transactions, as shown in FIG. 4B.

Figure 5:
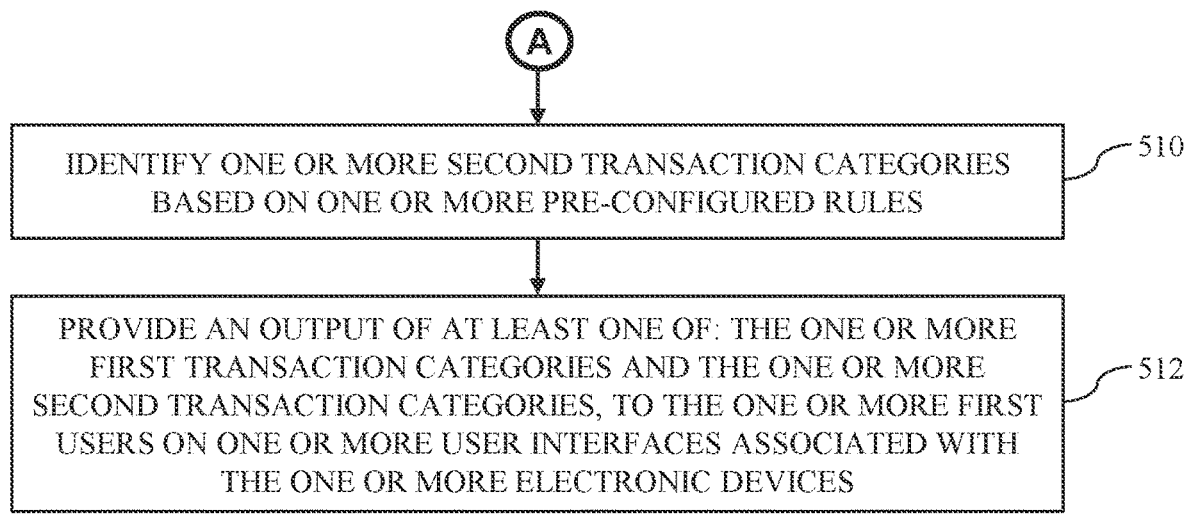
FIG. 5 is a flow chart illustrating a machine-learning based (ML-based) computing method for identifying the one or more transaction categories from the one or more coded enterprise resource planning (ERP) data, in accordance with an embodiment of the present disclosure.
Figure 5:
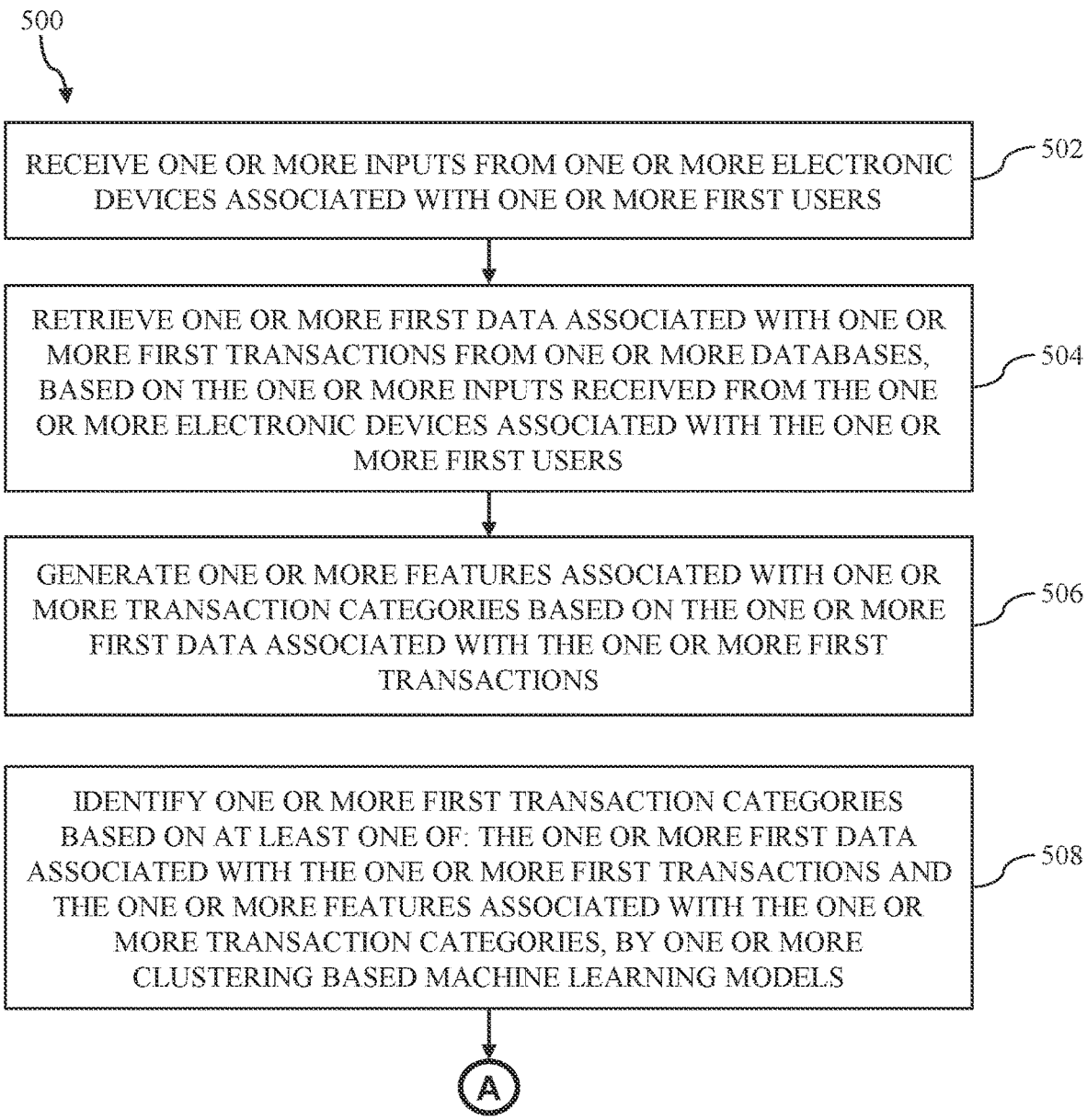

FIG. 5 is a flow chart illustrating the machine-learning based (ML-based) computing method 500 for identifying the one or more transaction categories from the one or more coded enterprise resource planning (ERP) data, in accordance with an embodiment of the present disclosure. At step 502, the one or more inputs are received from the one or more electronic devices 102 associated with the one or more first users. The one or more inputs may include the one or more first information related to at least one of: the one or more entities associated with the one or more second users and the one or more transaction datasets retrieved from the one or more enterprise resource planning (ERP) platforms At step 504, the one or more first data associated with one or more first transactions are retrieved from the one or more databases 108, based on the one or more inputs received from the one or more electronic devices 102 associated with the one or more first users. In an embodiment, the one or more first data associated with the one or more first transactions may include at least one of: the one or more document types, the one or more posting keys, the one or more posting dates, the one or more clearing dates, the one or more amounts, the one or more document numbers, the one or more clearing documents, and a combination of the one or more documents types and the one or more posting keys.

At step 506, the one or more features associated with the one or more transaction categories are generated based on the one or more first data associated with the one or more first transactions. The one or more features associated with the one or more transaction categories may include at least one of: the one or more cleared by features, the one or more cleared together features, and the one or more generated by features.

At step 508, the one or more first transaction categories are identified/classified based on at least one of: the one or more first data associated with the one or more first transactions and the one or more features associated with the one or more transaction categories, by the one or more clustering based machine learning models.

At step 510, the one or more second transaction categories are identified/classified based on the one or more pre-configured rules. In an embodiment, the one or more second transaction categories are unidentified transaction categories by the one or more clustering based machine learning models during identification of the one or more first transaction categories.

At step 512, the output of at least one of: the one or more first transaction categories and the one or more second transaction categories, is provided to the one or more first users on the one or more user interfaces associated with the one or more electronic devices 102. In FIG. 5, the circular symbol with "A" written inside is being used as an off-page connector. This is used for indicating that FIG. 5 continues in the next page.

The present invention has the following advantages. The present invention with the ML-based computing system 104 is configured to automatically identify the one or more transaction categories from the one or more coded enterprise resource planning (ERP) data. By leveraging the one or more clustering based machine learning models to decode these complex formats, businesses can streamline transaction processing, enable scalable automation, and reduce costly errors. The development of such systems may be key to unlocking the full potential of the one or more enterprise resource planning (ERP) platforms including the Systems Applications and Products (SAP®).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the ML-based computing system 104 either directly or through intervening I/O controllers. Network adapters may also be coupled to the ML-based computing system 104 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/ML-based computing system 104 in accordance with the embodiments herein. The ML-based computing system 104 herein comprises at least one processor or central processing unit (CPU). The CPUs are interconnected via the system bus 208 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the ML-based computing system 104. The ML-based computing system 104 can read the inventive instructions on the program storage devices and follow these instructions to execute the methodology of the embodiments herein.

The ML-based computing system 104 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an." and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that are issued on an application based here on. Accordingly, the embodiments of the present invention are intended to be illustrative, but not limiting, of the scope of the invention, which is set forth in the following claims.

What is claimed is:

1. A machine-learning based (ML-based) computing method for identifying one or more transaction categories from one or more coded enterprise resource planning (ERP) data, the machine-learning based (ML-based) computing method comprising:

receiving, by one or more hardware processors, one or more inputs from one or more electronic devices associated with one or more first users, wherein the one or more inputs comprise one or more first information related to at least one of: one or more entities associated with one or more second users and one or more transaction datasets;

retrieving, by the one or more hardware processors, one or more first data associated with one or more first transactions from one or more databases, based on the one or more inputs received from the one or more electronic devices associated with the one or more first users, wherein the one or more first data associated with the one or more first transactions comprise at least one of: one or more document types, one or more posting keys, one or more posting dates, one or more clearing dates, one or more amounts, one or more document numbers, one or more clearing documents, and a combination of the one or more documents types and the one or more posting keys;

generating, by the one or more hardware processors, one or more features associated with the one or more transaction categories based on the one or more first data associated with the one or more first transactions, wherein the one or more features associated with the one or more transaction categories comprise at least one of: one or more cleared by features, one or more cleared together features, and one or more generated by features, wherein generating the one or more cleared by features, comprising:

determining, by the one or more hardware processors, whether a percentage of a first amount associated with a first combination of a first document type and posting key pair is cleared by a second amount associated with a second combination of a second document type and posting key pair;

indicating, by the one or more hardware processors, one or more relationships between the first combination and second combination, when the first amount associated with the first combination is determined to be cleared by the second amount associated with the second combination; and indicating, by the one or more hardware processors, that the one or more first transactions grouped by the first combination and the second combination are mutually cleared, when a clearing document associated with the first combination is analogous to a clearing document associated with the second combination, and wherein generating the one or more cleared together features comprising:
determining, by the one or more hardware processors, whether a percentage of each combination of the one or more combinations of the document type and posting key pairs is cleared together with one or more other combinations of the document type and posting key pairs, wherein the one or more clearing documents and the one or more clearing dates are analogous for each combination of the one or more combinations of the document type and posting key pairs;

identifying, by the one or more hardware processors, one or more first transaction categories based on at least one of: the one or more first data associated with the one or more first transactions and the one or more features associated with the one or more transaction categories, by one or more clustering based machine learning models, wherein the one or more clustering-based machine learning models comprise at least one of:
Density-based Spatial Clustering of Applications with Noise (DBSCAN) model configured with one or more first hyperparameters; and
K-nearest neighbor (KNN) model configured with one or more second hyperparameters;

training, by the one or more hardware processors, the density-based spatial clustering of applications with noise (DBSCAN) model, wherein training the density-based spatial clustering of applications with noise (DBSCAN) model comprises:
receiving, by the one or more hardware processors, one or more training datasets associated with at least one of: the one or more first data associated with the one or more first transactions and the one or more features associated with the one or more transaction categories;
selecting, by the one or more hardware processors, the one or more first hyperparameters for training the density-based spatial clustering of applications with noise (DBSCAN) model, wherein the one or more first hyperparameters comprise at least one of: epsilon hyperparameter and minimum samples hyperparameter, wherein the epsilon hyperparameter indicating a radius within which one or more first data points are indicated as one or more neighbors, and wherein the minimum samples hyperparameter is configured to generate one or more first dense regions by determining a predetermined number of the one or more first data points required within the radius;
generating, by the one or more hardware processors, one or more first clustering models to automatically group the one or more first transactions comprising one or more analogical characteristics, based on the selected one or more first hyperparameters;
scanning, by the one or more hardware processors, the grouped one or more first transactions comprising the one or more analogical characteristics, with the one or more first data points to identify at least one of: the one or more first dense regions as the one or more clusters and one or more isolated first data points as the one or more noises;
determining, by the one or more hardware processors, one or more pairwise distances between the one or more first data points;
determining, by the one or more hardware processors, whether the one or more first data points satisfy a predetermined criteria of the one or more first hyperparameters; and
classifying, by the one or more hardware processors, the one or more first data points as at least one of: one or more first core data points indicating the one or more clusters, one or more first border data points, and one or more first noise data points indicating the one or more noises;

identifying, by the one or more hardware processors, one or more second transaction categories based on one or more pre-configured rules, wherein the one or more second transaction categories are unidentified transaction categories by the one or more clustering based machine learning models during identification of the one or more first transaction categories; and providing, by the one or more hardware processors, an output of at least one of: the one or more first transaction categories and the one or more second transaction categories, to the one or more first users on one or more user interfaces associated with the one or more electronic devices.

2. The machine-learning based (ML-based) computing method of claim 1, wherein the one or more transaction datasets indicate one or more structured compilations of one or more second data comprising at least one of: one or more financial data, of the one or more organizations, and
wherein the one or more transaction datasets comprise one or more financial events comprising one or more second information related to at least one of: one or more purchases, one or more sales, one or more payments, one or more investments, one or more loans, involvement of the one or more first users and the one or more second users, one or more amounts transacted, dates and times, and one or more transaction types.

3. The machine-learning based (ML-based) computing method of claim 1, wherein identifying, by the one or more hardware processors, the one or more second transaction categories based on the one or more pre-configured rules, comprises:
generating, by the one or more hardware processors, at least one of: one or more credit repositories and one or more debit repositories, wherein the one or more credit repositories comprise at least one of: one or more primary payments, one or more secondary payments, one or more payment reversals, one or more adjustments, and one or more deductions, and wherein the one or more debit repositories comprise at least one of:

one or more primary invoices, one or more secondary invoices, one or more invoice reversals, one or more credit memos, and one or more debit memos;

generating, by the one or more hardware processors, one or more permutations and combinations of one or more second transactions to minimize one or more differences between one or more values of the one or more credit repositories and the one or more debit repositories;

applying, by the one or more hardware processors, a combination of a document type and posting key pair in the one or more credit repositories and the one or more debit repositories, in one or more distributions;

determining, by the one or more hardware processors, one or more differences between the one or more credit repositories and the one or more debit repositories, for each distribution; and selecting, by the one or more hardware processors, the one or more distributions where the one or more differences between the one or more credit repositories and the one or more debit repositories provide a predetermined value.

4. The machine-learning based (ML-based) computing method of claim 1, further comprising generating, by the one or more hardware processors, the one or more relationships between the one or more combinations of the document type and posting key pairs in the one or more first transactions, based on the one or more generated by features, by:

determining, by the one or more hardware processors, whether first transaction data associated with the first combination of the first document type and posting key pair is generated by second transaction data associated with the second combination of the second document type and posting key pair; and indicating, by the one or more hardware processors, one or more dependencies where a first transaction associated with the first combination of the first document type and posting key pair, is linked to a second transaction associated with the second combination of the second document type and posting key pair, when the first transaction data are determined to be generated by the second transaction data.

5. The machine-learning based (ML-based) computing method of claim 1, further comprising validating, by the one or more hardware processors, the density-based spatial clustering of applications with noise (DBSCAN) model based on one or more validation datasets, wherein validating the density-based spatial clustering of applications with noise (DBSCAN) model comprises:

determining, by the one or more hardware processors, whether one or more first results of the one or more clusters associated with the one or more first transactions satisfy one or more first predetermined threshold results; and performing, by the one or more hardware processors, one or more first processes comprising at least one of: preprocessing of the one or more training datasets associated with at least one of: the one or more first data and the one or more features, adjusting of at least one of: the one or more first data and the one or more features, and adjusting of the one or more first hyperparameters, until the one or more first results of the one or more clusters associated with the one or more first transactions satisfy the one or more first predetermined threshold results.

6. The machine-learning based (ML-based) computing method of claim 1, further comprising training, by the one or more hardware processors, the one or more clustering based machine learning models comprising the K-nearest neighbor (KNN) model, wherein training the K-nearest neighbor (KNN) model comprises:

receiving, by the one or more hardware processors, the one or more training datasets associated with at least one of: the one or more first data associated with the one or more first transactions and the one or more features associated with the one or more transaction categories;

selecting, by the one or more hardware processors, the one or more second hyperparameters for training the K-nearest neighbor (KNN) model, wherein the one or more second hyperparameters comprise at least one of: one or more nearest neighbors hyperparameter, distance metric hyperparameter, weight function hyperparameter, leaf size hyperparameter, Minkowski distance metric hyperparameter, standardization hyperparameter, and N_jobs hyperparameter;

generating, by the one or more hardware processors, one or more second clustering models to automatically group the one or more first transactions comprising the one or more analogical characteristics, based on the selected one or more second hyperparameters;

scanning, by the one or more hardware processors, the grouped one or more first transactions comprising the one or more analogical characteristics, with one or more second data points to identify at least one of: one or more second dense regions as the one or more clusters and one or more second isolated data points as the one or more noises;

determining, by the one or more hardware processors, one or more distances between the one or more second data points by the distance metric hyperparameter;

identifying, by the one or more hardware processors, one or more nearest neighbors based on the determined one or more distances between the one or more second data points; and assigning, by the one or more hardware processors, one or more labels to the one or more nearest neighbors based on a classification of the one or more nearest neighbors.

7. The machine-learning based (ML-based) computing method of claim 6, further comprising validating, by the one or more hardware processors, the K-nearest neighbor (KNN) model based on the one or more validation datasets, wherein validating the K-nearest neighbor (KNN) model comprises:

determining, by the one or more hardware processors, whether one or more second results of the one or more clusters associated with the one or more first transactions satisfy one or more second predetermined threshold results; and performing, by the one or more hardware processors, one or more second processes comprising at least one of: preprocessing of the one or more training datasets associated with at least one of: the one or more first data and the one or more features, adjusting of at least one of: the one or more first data and the one or more features, and adjusting of the one or more second hyperparameters, until the one or more second results of the one or more clusters associated with the one or more first transactions satisfy the one or more second predetermined threshold results.

8. The machine-learning based (ML-based) computing method of claim 1, further comprising re-training, by the one or more hardware processors, the one or more machine learning models over a plurality of time intervals based on one or more training data, wherein re-training the one or more machine learning models over the plurality of time intervals comprises:
receiving, by the one or more hardware processors, the one or more training data associated with the one or more first transactions over the plurality of time intervals;
adding, by the one or more hardware processors, the one or more training data with the one or more training datasets to generate one or more updated training datasets;
re-training, by the one or more hardware processors, the one or more machine learning models based on the one or more updated training datasets; and
executing, by the one or more hardware processors, the re-trained one or more machine learning models in a transaction category identification subsystem to identify the one or more first transaction categories.

9. A machine learning based (ML-based) computing system for identifying one or more transaction categories from one or more coded enterprise resource planning (ERP) data, the machine learning based (ML-based) computing system comprising:
one or more hardware processors;
a memory coupled to the one or more hardware processors, wherein the memory comprises a plurality of subsystems in form of programmable instructions executable by the one or more hardware processors, and wherein the plurality of subsystems comprises:
an input receiving subsystem configured to receive one or more inputs from one or more electronic devices associated with one or more first users, wherein the one or more inputs comprise one or more first information related to at least one of: one or more entities associated with one or more second users and one or more transaction datasets;
a data retrieval subsystem configured to retrieve one or more first data associated with one or more first transactions from one or more databases, based on the one or more inputs received from the one or more electronic devices associated with the one or more first users, wherein the one or more first data associated with the one or more first transactions comprise at least one of: one or more document types, one or more posting keys, one or more posting dates, one or more clearing dates, one or more amounts, one or more document numbers, one or more clearing documents, and a combination of the one or more documents types and the one or more posting keys;
a feature generation subsystem configured to generate one or more features associated with the one or more transaction categories based on the one or more first data associated with the one or more first transactions, wherein the one or more features associated with the one or more transaction categories comprise at least one of: one or more cleared by features, one or more cleared together features, and one or more generated by features,
wherein to generate the one or more cleared by features, the feature generation subsystem is configured to:
determine whether a percentage of a first amount associated with a first combination of a first document type and posting key pair is cleared by a second amount associated with a second combination of a second document type and posting key pair;
indicate one or more relationships between the first and second combination, when the first amount associated with the first combination is determined to be cleared by the second amount associated with the second combination; and
indicate that the one or more first transactions grouped by the first combination and the second combination are mutually cleared, when a clearing document associated with the first combination is analogous to a clearing document associated with the second combination;
wherein to generate the one or more cleared together features, the feature generation subsystem is configured to:
determine whether a percentage of each combination of the one or more combinations of the document type and posting key pairs is cleared together with the one or more other combinations of the document type and posting key pairs, wherein the one or more clearing documents and the one or more clearing dates are analogous for each combination of the one or more combinations of the document type and posting key pairs;
a transaction category identification subsystem configured to:
identify one or more first transaction categories based on at least one of: the one or more first data associated with the one or more first transactions and the one or more features associated with the one or more transaction categories, by one or more clustering based machine learning models, wherein the one or more clustering-based machine learning models comprise at least one of:
Density-based Spatial Clustering of Applications with Noise (DBSCAN) model configured with one or more first hyperparameters; and
K-nearest neighbor (KNN) model configured with one or more second hyperparameters; and
identify one or more second transaction categories based on one or more pre-configured rules, wherein the one or more second transaction categories are unidentified transaction categories by the one or more clustering based machine learning models during identification of the one or more first transaction categories; a training subsystem configured to:
train the one or more clustering based machine learning models comprising the density-based spatial clustering of applications with noise (DBSCAN) model by:
receiving one or more training datasets associated with at least one of: the one or more first data associated with the one or more first transactions and the one or more features associated with the one or more transaction categories;
selecting the one or more first hyperparameters for training the density-based spatial clustering of applications with noise (DBSCAN) model, wherein the one or more first hyperparameters comprise at least one of: epsilon hyperparameter and minimum samples hyperparameter, wherein the epsilon hyperparameter indicating a radius within which one or more first data points are indicated as one or more neighbors, and wherein the minimum samples hyperparameter is configured to generate one or more first dense regions by determining a predetermined number of the one or more first data points required within the radius;

generating one or more first clustering models to automatically group the one or more first transactions comprising one or more analogical characteristics, based on the selected one or more first hyperparameters;

scanning the grouped one or more first transactions comprising the one or more analogical characteristics, with the one or more first data points to identify at least one of: the one or more first dense regions as the one or more clusters and one or more isolated first data points as the one or more noises;

determining one or more pairwise distances between the one or more first data points;

determining whether the one or more first data points satisfy a predetermined criteria of the one or more first hyperparameters; and classifying the one or more first data points as at least one of: one or more first core data points indicating the one or more clusters, one or more first border data points, and one or more first noise data points indicating the one or more noises; and an output subsystem configured to provide an output of at least one of: the one or more first transaction categories and the one or more second transaction categories, to the one or more first users on one or more user interfaces associated with the one or more electronic devices.

10. The machine-learning based (ML-based) computing system of claim 9, wherein the feature generation is further configured to generate the one or more relationships between the one or more combinations of the document type and posting key pairs in the one or more first transactions, based on the one or more generated by features, and wherein in generating the one or more relationships between the one or more combinations of the document type and posting key pairs in the one or more first transactions, the feature generation is configured to:

determine whether first transaction data associated with the first combination of the first document type and posting key pair are generated by second transaction data associated with the second combination of the second document type and posting key pair; and indicate one or more dependencies where a first transaction associated with the first combination of the first document type and posting key pair, is linked to a second transaction associated with the second combination of the second document type and posting key pair, when the first transaction data are determined to be generated by the second transaction data.

11. The machine-learning based (ML-based) computing method of claim 9, wherein the training subsystem is further configured to validate the density-based spatial clustering of applications with noise (DBSCAN) model based on one or more validation datasets, and wherein in validating the density-based spatial clustering of applications with noise (DBSCAN) model, the training subsystem is configured to:

determine whether one or more first results of the one or more clusters associated with the one or more first transactions satisfy one or more first predetermined threshold results; and perform one or more first processes comprising at least one of: preprocessing of the one or more training datasets associated with at least one of: the one or more first data and the one or more features, adjusting of at least one of: the one or more first data and the one or more features, and adjusting of the one or more first hyperparameters, until the one or more first results of the one or more clusters associated with the one or more first transactions satisfy the one or more first predetermined threshold results.

12. The machine-learning based (ML-based) computing system of claim 9, wherein the training subsystem is further configured to train the K-nearest neighbor (KNN) model, wherein in training the K-nearest neighbor (KNN) model, the training subsystem is configured to:

receive the one or more training datasets associated with at least one of: the one or more first data associated with the one or more first transactions and the one or more features associated with the one or more transaction categories;

select the one or more second hyperparameters for training the K-nearest neighbor (KNN) model, wherein the one or more second hyperparameters comprise at least one of: one or more nearest neighbors hyperparameter, distance metric hyperparameter, weight function hyperparameter, leaf size hyperparameter, Minkowski distance metric hyperparameter, standardization hyperparameter, and N_jobs hyperparameter;

generate one or more second clustering models to automatically group the one or more first transactions comprising the one or more analogical characteristics, based on the selected one or more second hyperparameters;

scan the grouped one or more first transactions comprising the one or more analogical characteristics, with one or more second data points to identify at least one of: one or more second dense regions as the one or more clusters and one or more second isolated data points as the one or more noises;

determine one or more distances between the one or more second data points by the distance metric hyperparameter;

identify one or more nearest neighbors based on the determined one or more distances between the one or more second data points; and assign one or more labels to the one or more nearest neighbors based on a classification of the one or more nearest neighbors.

13. The machine-learning based (ML-based) computing system of claim 9, wherein the training subsystem is further configured to re-train the one or more machine learning models over a plurality of time intervals based on one or more training data, and wherein in re-training the one or more machine learning models over the plurality of time intervals, the training subsystem is configured to:

receive the one or more training data associated with the one or more first transactions over the plurality of time intervals;

add the one or more training data with the one or more training datasets to generate one or more updated training datasets;

re-train the one or more machine learning models based on the one or more updated training datasets; and execute the re-trained one or more machine learning models in a transaction category identification subsystem to identify the one or more first transaction categories.

14. A non-transitory computer-readable storage medium having instructions stored therein that when executed by a hardware processor, cause the processor to execute operations of:

receiving one or more inputs from one or more electronic devices associated with one or more first users, wherein the one or more inputs comprise one or more first information related to at least one of: one or more entities associated with one or more second users and one or more transaction datasets;

retrieving one or more first data associated with one or more first transactions from one or more databases, based on the one or more inputs received from the one or more electronic devices associated with the one or more first users, wherein the one or more first data associated with the one or more first transactions comprise at least one of: one or more document types, one or more posting keys, one or more posting dates, one or more clearing dates, one or more amounts, one or more document numbers, one or more clearing documents, and a combination of the one or more documents types and the one or more posting keys;

generating one or more features associated with the one or more transaction categories based on the one or more first data associated with the one or more first transactions, wherein the one or more features associated with the one or more transaction categories comprise at least one of: one or more cleared by features, one or more cleared together features, and one or more generated by features, wherein generating the one or more cleared by features, comprising:

determining, by the one or more hardware processors, whether a percentage of a first amount associated with a first combination of a first document type and posting key pair is cleared by a second amount associated with a second combination of a second document type and posting key pair; and indicating, by the one or more hardware processors, one or more relationships between the first combination and second combination, when the first amount associated with the first combination is determined to be cleared by the second amount associated with the second combination; and indicating, by the one or more hardware processors, that the one or more first transactions grouped by the first combination and the second combination are mutually cleared, when a clearing document associated with the first combination is analogous to a clearing document associated with the second combination;

wherein generating the one or more cleared together features comprising:

determining, by the one or more hardware processors, whether a percentage of each combination of the one or more combinations of the document type and posting key pairs is cleared together with one or more other combinations of the document type and posting key pairs, wherein the one or more clearing documents and the one or more clearing dates are analogous for each combination of the one or more combinations of the document type and posting key pairs;

identifying one or more first transaction categories based on at least one of: the one or more first data associated with the one or more first transactions and the one or more features associated with the one or more transaction categories, by one or more clustering based machine learning models, wherein the one or more clustering-based machine learning models comprise at least one of:

Density-based Spatial Clustering of Applications with Noise (DBSCAN) model configured with one or more first hyperparameters; and K-nearest neighbor (KNN) model configured with one or more second hyperparameters;

training the density-based spatial clustering of applications with noise (DBSCAN) model, wherein training the density-based spatial clustering of applications with noise (DBSCAN) model comprises:

receiving one or more training datasets associated with at least one of: the one or more first data associated with the one or more first transactions and the one or more features associated with the one or more transaction categories;

selecting the one or more first hyperparameters for training the density-based spatial clustering of applications with noise (DBSCAN) model, wherein the one or more first hyperparameters comprise at least one of: epsilon hyperparameter and minimum samples hyperparameter, wherein the epsilon hyperparameter indicating a radius within which one or more first data points are indicated as one or more neighbors, and wherein the minimum samples hyperparameter is configured to generate one or more first dense regions by determining a predetermined number of the one or more first data points required within the radius;

generating one or more first clustering models to automatically group the one or more first transactions comprising one or more analogical characteristics, based on the selected one or more first hyperparameters;

scanning the grouped one or more first transactions comprising the one or more analogical characteristics, with the one or more first data points to identify at least one of: the one or more first dense regions as the one or more clusters and one or more isolated first data points as the one or more noises;

determining one or more pairwise distances between the one or more first data points;

determining whether the one or more first data points satisfy a predetermined criteria of the one or more first hyperparameters; and classifying the one or more first data points as at least one of: one or more first core data points indicating the one or more clusters, one or more first border data points, and one or more first noise data points indicating the one or more noises;

identifying one or more second transaction categories based on one or more pre-configured rules, wherein the one or more second transaction categories are unidentified transaction categories by the one or more clustering based machine learning models during identification of the one or more first transaction categories; and providing an output of at least one of: the one or more first transaction categories and the one or more second transaction categories, to the one or more first users on one or more user interfaces associated with the one or more electronic devices.

* * * * *